United States Patent [19]

Corghi

[11] Patent Number: 5,219,012
[45] Date of Patent: Jun. 15, 1993

[54] TIRE REMOVAL MACHINE WITH RECLINABLE SELF-CENTERING UNIT

[75] Inventor: Remo Corghi, Correggio, Italy
[73] Assignee: Corghi - S.p.A., Correggio, Italy
[21] Appl. No.: 779,803
[22] Filed: Oct. 21, 1991
[30] Foreign Application Priority Data Oct. 22, 1990 [IT] Italy ................ 46883 A/90

[51] Int. Cl.$^5$ ............................................. B60C 25/00
[52] U.S. Cl. ............................................. 157/19; 157/16
[58] Field of Search ................................. 157/16, 19, 20

[56] References Cited

U.S. PATENT DOCUMENTS

| | | | |
|---|---|---|---|
| 2,213,535 | 9/1940 | Seip | 157/19 |
| 3,168,130 | 2/1985 | Turpin . | |
| 4,039,016 | 8/1977 | Cunningham . | |
| 5,060,708 | 10/1991 | Hansen | 157/19 |

FOREIGN PATENT DOCUMENTS

| | | |
|---|---|---|
| 2416668 | 4/1974 | Fed. Rep. of Germany . |
| 2936094 | 3/1980 | Fed. Rep. of Germany . |
| 3614738 | 11/1987 | Fed. Rep. of Germany . |
| 1573575 | 7/1969 | France . |
| 2029341 | 3/1980 | United Kingdom . |

*Primary Examiner*—James G. Smith

[57] ABSTRACT

A tire-removal machine comprises a frame (1) with a self-centering unit (4) for locking the wheels in a horizontal position in front of an overlying tool head (13) for mounting/removing the respective tires. The self-centering unit is connected to the frame (1) by way of a vertically lying articulated parallelogram having one the (55-66) formed by said frame, to the side (5-6) opposite the preceding there being hinged the self-centering unit in such a manner that this unit is able to occupy a lowered wheel loading/unloading position in which it is close to the floor and inclined to the side opposite the frame, and a raised working position, selectable at will, in which it arranges the wheel horizontal and within the radius of action of the tool head.

18 Claims, 3 Drawing Sheets

5,219,012

TIRE REMOVAL MACHINE WITH RECLINABLE SELF-CENTERING UNIT

BACKGROUND OF THE INVENTION

This invention relates to a machine for removing/mounting tires from and on respective wheel rims.

The invention is typically but not exclusively suitable for wheels which are relatively large and/or wide and hence relatively heavy.

DESCRIPTION OF BACKGROUND ART

For tire removal and mounting operations, tire-removal machines are known to be used comprising generally a base frame, a rear column, a horizontal slide bar positioned at the top of said column, a vertical rod which slides relative to the front end of said bar, and a tool head for extracting/inserting the tire beads from and into the respective wheel rims, said tool head being fixed to the lower end of said rod so that it lies above an underlying self-centering unit.

Said self-centering unit comprises in its turn a horizontal circular plate which is rotated by an underlying vertical shaft emerging from said frame and provided with a circumferential series of radially slidable equidistant jaws provided for locking the wheel rims in a horizontal position.

Said known self-centering units have however proved unsatisfactory.

A first reason is that the operator is required to raise the wheel from the floor in order to load it onto the self-centering unit, which is stationary in height, and vice versa. This is evidently fatiguing, particularly when handling relatively large and/or wide wheels, such as wheels for small trucks.

A second reason is that very often the operator is not in the optimum working position relative to the wheel locked on the self-centering unit, because the width of two different wheels can differ considerably. An example of this is the difference between a wheel of a small car and of a truck. Consequently the height at which the upper bead is located is bad both from the comfort and from the ergonomic aspect, leading to dangerous situations especially when the operator has to use a lever, such as when disengaging the bead from the rim.

SUMMARY OF THE INVENTION

The main object of the present invention is to obviate the aforesaid problems within the context of a simple and rational design.

Said object is attained by the self-centering unit according to the invention, wherein the base frame and the self-centering unit are connected together in such a manner that this latter occupies a horizontal raised working position in which the wheel is arranged facing the tool head, and a lowered rest position in which the self-centering unit is inclined towards the floor to allow the wheel to be unloaded/loaded from and onto the self-centering unit without the wheel having to be lifted.

In addition, said raised working position can be selected at will according to the width of the wheel being handled. All the objects of the invention are hence attained, as is apparent from the aforegoing.

According to a first preferred embodiment, said raising movement is achieved by an articulated parallelogram system having two opposing sides consisting respectively of the machine frame and the casing of the self-centering unit.

In addition, according to said preferred embodiment, the swivel movement of the self-centering unit is achieved by a variable-length arm which forms one of the other sides of the parallelogram.

According to a further embodiment, the sides of the parallelogram are all of fixed length, the self-centering unit being hinged to that side of the parallelogram which is opposite the machine frame.

To swivel the self-centering unit a variable-length arm is provided, such as a cylinder-piston unit, which connects said self-centering unit, to one of the adjacent sides of the parallelogram.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The characteristics and constructional principles of the invention will be apparent from the detailed description given hereinafter with reference to the accompanying figures, which illustrate a particular preferred embodiment thereof by way of non-limiting example.

DESCRIPTION OF THE PREFERRED EMBODIMENTS

Figure 1:
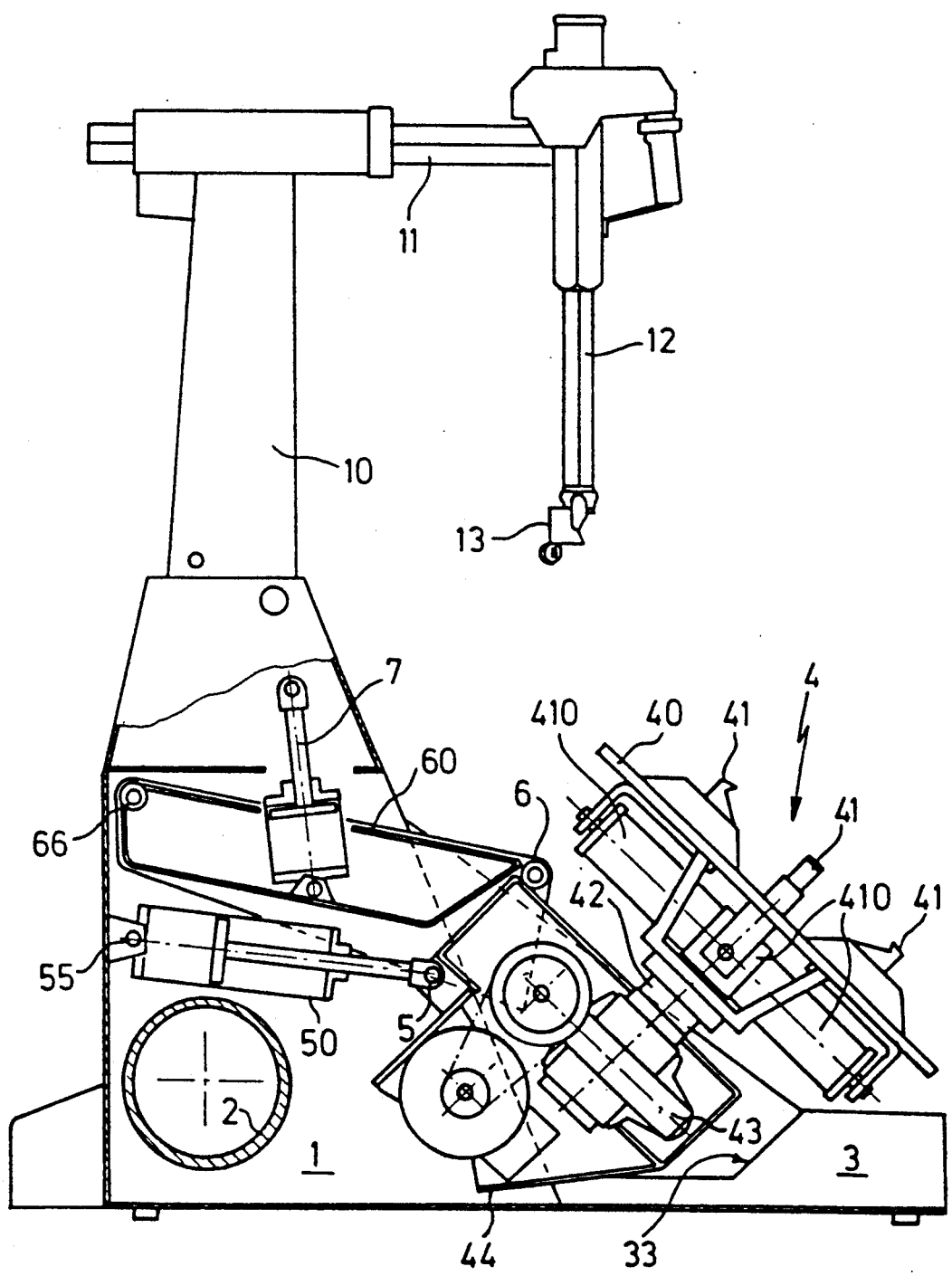
FIG. 1 is a partly sectional side elevation of the invention, the self-centering unit being shown in its lowered inclined position.

Firstly, for clarity and simplicity, and with reference to the introduction, it should be noted that said two different raised working positions relate for example to two wheels of different width.

As can be seen in the accompanying figures, the invention comprises a base frame 1 of an open casing to accommodate a tool.

The uprights of said casing are connected by the cylinder of a cylinder-piston unit 2 which controls a usual tool positioned on the outside of the frame for removing the tire beads from the respective retention edges of the wheel rims, there being provided to the front of the casing a platform 3. Between this latter and the frame 1 there is a recessed portion or compartment 33 which may receive the lower part of a self-centering unit 4, which will be described hereinafter.

At the top of the frame 1 there is a column 10 which upperly supports a slidable horizontal bar 11 of prismatic shape.

The front end of the bar 11 supports a slidable vertical prismatic rod 12, to the bottom of which there is fixed a tool head 13, this latter being of known type in terms both of configuration and function.

Said self-centering unit 4 comprises a circular plate 40 provided with a circumferential series of radially movable equidistant jaws 41 of the double action type (in the sense that they grip the rims both from the outside and from the inside).

Said jaws 41 are usually operated by underlying double-acting pneumatic cylinder-piston units 410 arranged parallel to the direction of movement of the respective jaws 41. The plate 40 is rotated by a coaxial shaft 42 driven by a drive unit 43 of known type.

This latter is housed in an enclosing casing 44 which on the side facing the frame 1 comprises two overlying horizontal shafts 5 and 6 respectively, arranged parallel to the upper horizontal wall of said open frame 1.

A double-acting pneumatic cylinder-piston unit 50 and a box member 60 are hinged respectively to said two shafts 5 and 6 and have their other ends hinged to rods 55 and 66 fixed to the vertical walls of frame 1.

In this manner an articulated parallelogram is formed having one side defined by the frame 1 (articulation points 55, 66), whereas the lower side following the preceding is of variable length and includes the cylinder-piston unit 50.

Finally, between the box member 60 and the overlying upper horizontal wall of the frame 1 a double-acting pneumatic cylinder-piston unit 7 is connected.

Figure 2:
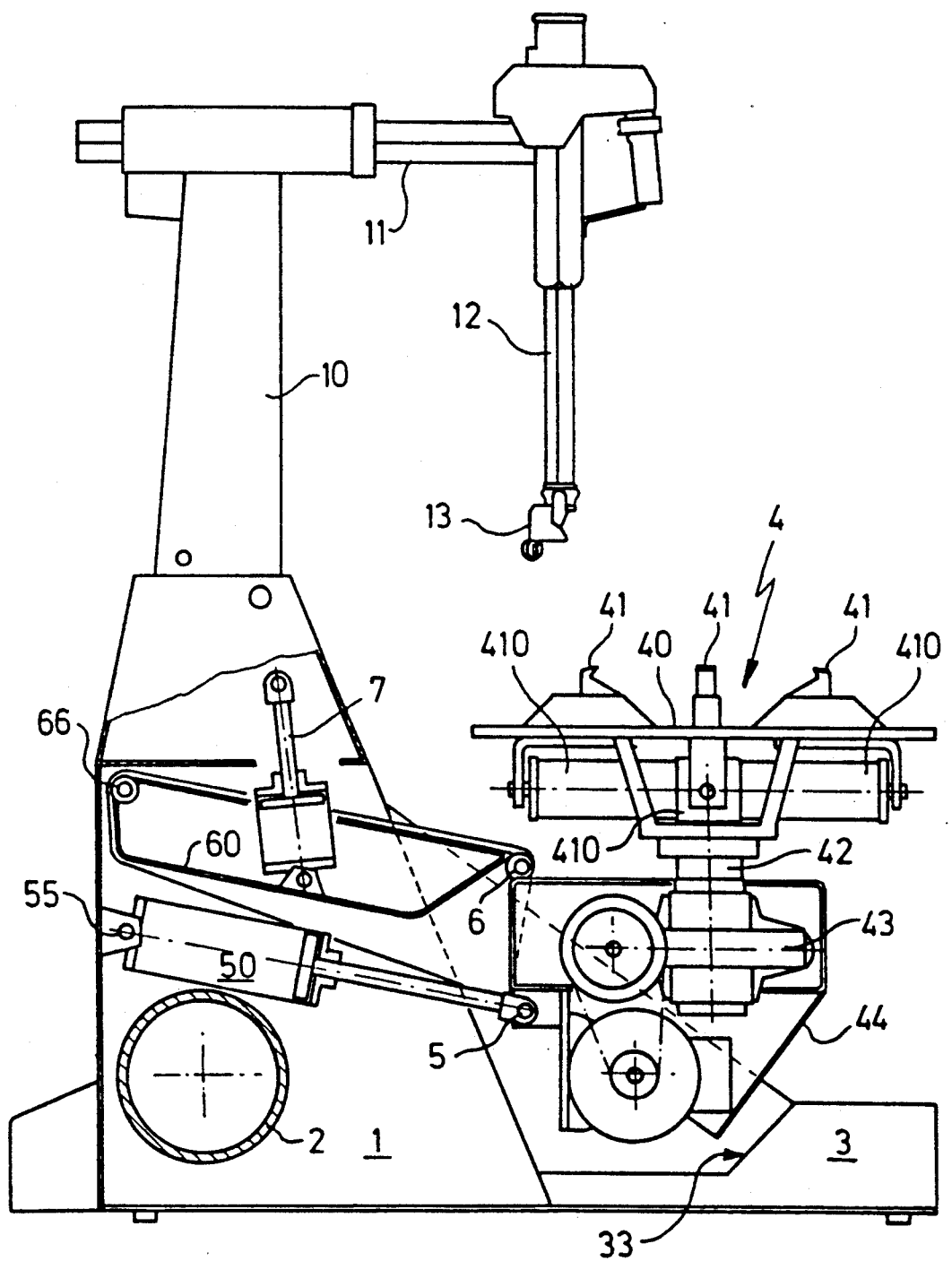
FIGS. 2 and 3 are two views similar to the preceding, showing the self-centering unit in two different raised working positions.
Figure 3:
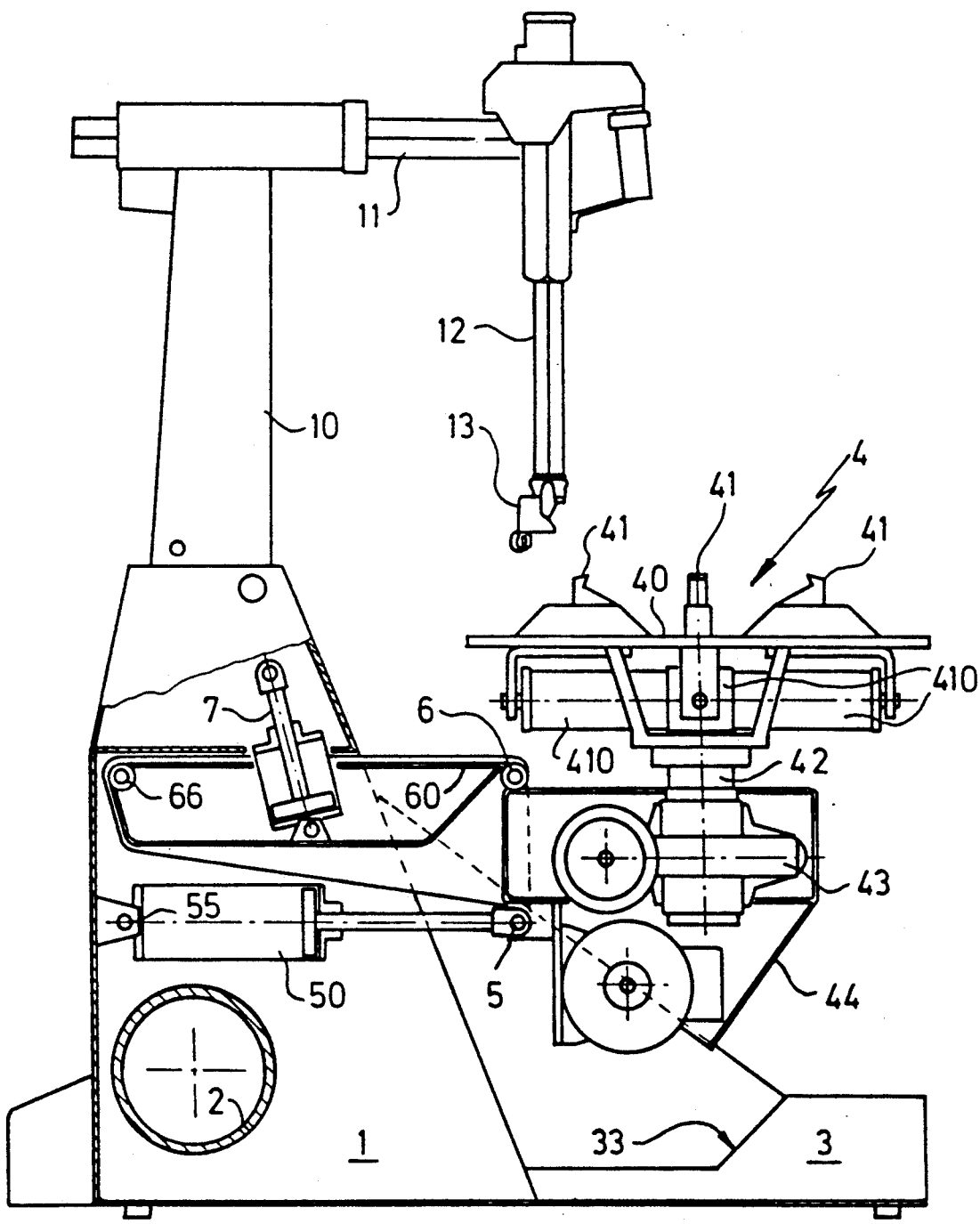

The purpose of the cylinder-piston unit 7 is to raise/lower the self-centering unit 4, which when the distance 5–55 is equal to the distance 6–66 moves parallel to itself (see FIGS. 2, 3), whereas the purpose of the cylinder-piston unit 50 is to cause said self-centering unit 4 to swivel about the shaft 6, as shown in FIG. 1. When the self-centering unit 4 is in this latter position, a wheel can be very easily loaded by merely being rolled along the floor and, when positioned in front of the plate 40 of the self-centering unit 4, being allowed to rest laterally on this latter.

In this manner it can be gripped by the jaws 41 (which are retracted).

The unloading of the wheel is likewise simplified.

It should also be noted that the same results are obtained if the parallelogram sides defined by the pairs of axes 5, 55 and 5, 6 consist of two rigid (or fixed-length) connecting rods, if the self-centering unit is hinged to a connecting rod 5–6 and is connected to a cylinder-piston unit having its other end hinged to the connecting rod 5, 6. This embodiment, which is simple to comprehend, is not illustrated in the figures.

The merits and advantages of the invention are apparent from the aforegoing and from an examination of the accompanying figures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tire-removal machine comprising:
   an open frame having an overlying tool head for removing and mounting tires, the frame resting on a floor;
   a self-centering unit for holding a tire; and
   means for pivoting the self-centering unit between a lowered position and a raised position, the self-centering unit holding the tire close to the overlying tool head when in the raised position and holding the tire close to the floor when in the lowered position, the self-centering unit being inclined when in the lowered position and being generally horizontal when in the raised position, the means for pivoting comprising,
   first and second generally parallel members both connected between the frame and the self-centering unit, the first generally parallel member being an extensible arm movable between a retracted position and an extended position, the self-centering unit being generally horizontal when the arm is in the extended position and being inclined when the arm is in the retracted position.

2. The machine as claimed in claim 1, wherein the means for pivoting has a vertically lying articulated trapezoidal shape, opposing sides of which are the first and second generally parallel members, the first and second generally parallel members being connected between the frame and a casing of the self-centering unit, the means for pivoting further comprises a cylinder-piston unit connected to the frame and the second generally parallel member, the cylinder-piston unit raising and lowering the first and second generally parallel members and the self-centering unit between the raised position and the lowered position.

3. The machine as claimed in 1, wherein the extensible arm comprises a cylinder-piston unit.

4. The machine as claimed in claim 2, wherein the means for pivoting having said articulated trapezoidal shape has three elements of fixed length, the three elements being the second generally parallel member, the frame and the self-centering unit, the self-centering unit being pivoted on the second generally parallel member about an axis which is generally parallel to an axis where the second generally parallel member is attached to the frame.

5. The machine as claimed in claim 4, wherein the extensible arm of the means for pivoting the self-centering unit comprises a cylinder-piston unit, which connects said self-centering unit to the frame.

6. The machine as claimed in claim 1, wherein the first generally parallel member is the extensible arm and the second generally parallel member is a box member having a generally flat shape.

7. The machine as claimed in claim 1, wherein the means for pivoting further comprises means for raising and lowering the generally parallel members to move the self-centering unit between the lowered position and the raised position.

8. The machine as claimed in claim 7, wherein the means for raising and lowering comprises a cylinder-piston unit.

9. The machine as claimed in claim 8, wherein the cylinder-piston unit being connected to the second generally parallel member.

10. The machine as claimed in claim 9, wherein the second generally parallel member is a rigid, non-extensible box member having first and second ends, the self-centering unit being connected to the first end of the box member and the frame being connected to the second end of the box member, the cylinder-piston unit being connected to the box member between the first and second ends thereof.

11. The machine as claimed in claim 1, further comprising means for raising and lowering the generally parallel members to move the self-centering unit between the lowered position and the raised position, the means for raising and lowering being connected between the frame and the second generally parallel member.

12. The machine as claimed in claim 11, wherein the first generally parallel member is located below the second generally parallel member.

13. The machine as claimed in claim 12, wherein the second generally parallel member is a rigid, non-extensible box member extending between the frame and the self-centering unit.

14. The machine as claimed in claim 13, wherein the means for raising and lowering comprises a cylinder-piston unit.

15. The machine as claimed in claim 1, wherein the first generally parallel member is connected to the self-centering unit about a first axis and wherein the second generally parallel member is connected to the self-centering unit about a second axis, the first and second axes being generally parallel.

16. The machine as claimed in claim 15, wherein the first generally parallel member is connected to the frame about a third axis and the second generally parallel member is connected to the frame about a fourth axis, the third and fourth axes being generally parallel.

17. The machine as claimed in claim 16, wherein the first, second, third and fourth axes are all generally parallel to one another, the first and second axes being movable as the self-centering unit moves between the raised and lowered positions and the third and fourth axes being generally non-movable.

18. The machine as claimed in claim 17, wherein the second axis is generally a uniform distance from the fourth axis as the self-centering unit moves between the raised and lowered positions while a distance between the first and third axes varies as the self-centering unit moves between the raised and lowered positions.

* * * * *